(No Model.)
W. C. ALLISON
Well Pole.
No. 240,877. Patented May 3, 1881.
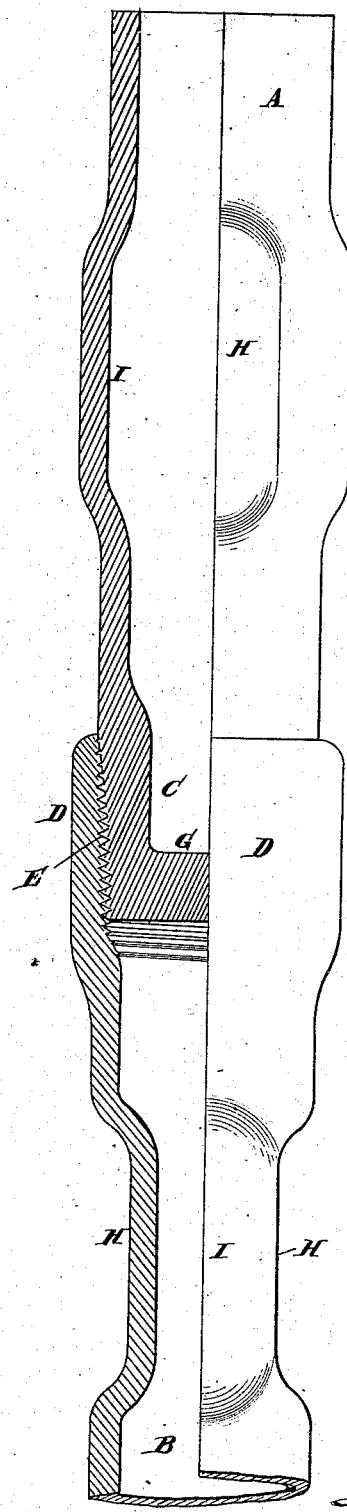
Attests
L. J. Matos
Davis
Inventor
William C Allison
By his atty

UNITED STATES PATENT OFFICE.

WILLIAM C. ALLISON, OF PHILADELPHIA, PENNSYLVANIA.

WELL-POLE.

SPECIFICATION forming part of Letters Patent No. 240,877, dated May 3, 1881.

Application filed March 11, 1881. (No model.)

*To all whom it may concern:*

Be it known that I, WILLIAM C. ALLISON, of the city and county of Philadelphia, and State of Pennsylvania, have invented an Improvement in Well-Poles, of which the following is a specification.

My invention has reference to well-poles for oil-wells; and it consists in forming the pole of tube-sections having their ends upset and screw-threaded, the lower end of one section being adapted to screw into the next section below; further, in closing the orifice in the lower ends of the tubes, to prevent the upward flow of the oil or other liquids; and, finally, in flattening the tubes at one or more places, forming plane surfaces, whereby the sections of tubing may be unscrewed one from the other without requiring special tools, as has heretofore been the case.

The object of my invention is to construct a well-pole so that the joint between any two sections shall be very strong; further, to prevent the flow of liquids up through the pole; and, finally, to provide the pole with means whereby it may be grasped to uncouple any two adjoining sections, and without the use of special tools.

In the drawing is shown an elevation of part of two adjacent tubes forming a portion of a well-pole, said elevation being one-half in section.

A and B are two adjacent poling-tubes, and are substantially the same in all particulars. The upper ends, D, of said tubes are upset and internally screw-threaded, and, if desired, may be slightly expanded. The lower or bottom ends, C, of said tubes are upset and externally screw-threaded, said upsetting extending inward, tending to narrow the orifice in said tube considerably, which orifice is closed by screwing or welding a metallic plug, G, therein. The screw-threads E are preferably made vanishing, as shown, but may also be horizontal, if desired. Near one or both ends the tubes are flattened for a short distance, creating flat or plane surfaces H on opposite sides, and creating bulges or extensions I on the tubes at these points at right angles to the surfaces H. The flat surface H is shown in elevation on end of tube B, and bulge in elevation on end of tube A. By this construction a simple pair of tongs or a wrench is sufficient to couple or uncouple two sections.

Having now described my invention, what I claim as new, and desire to secure by Letters Patent, is—

1. In a well-pole, two or more sections coupled together by a joint in which both ends of the tubes are upset, one externally and open and the other internally and plugged, the latter being screwed into the former by means of a vanishing screw-thread, as and for the purpose specified.

2. A tube-section for well-poles, consisting of a tube one end of which is externally upset and internally screw-threaded and the other end internally upset, externally screw-threaded, and having its end or orifice plugged to prevent the passage of liquid, as and for the purpose specified.

3. A tube-section for well-poles, consisting of a tube one end of which is externally upset and internally screw-threaded and the other end internally upset, externally screw-threaded, and having its end or orifice plugged to prevent passage of liquids, said tube being further provided with flattened or plane surfaces at or near its ends, as and for the purpose specified.

4. In a well-pole, a tube having the ends threaded, and provided with one or more flattened surfaces, the cross-section of the tube at said points being substantially elliptical, giving two surfaces opposite to each other for the attachment of a wrench in coupling and uncoupling two sections of tubing, as shown and described.

5. A tube-section for a well-pole, provided with a plugged end, G, to prevent the passage of liquid upward through the pole, as shown and described.

In testimony of which invention I hereunto set my hand.

WILLIAM C. ALLISON.

Witnesses:
CHARLES F. ZEIGLER,
L. J. MÁTOS.